D. SHIVE,

Assignor, by mesne assignments, to J. B. POWELL & J. C. SHERBORNE.

Spring-Motor.

No. 8,872. Reissued Aug. 26, 1879.

Witnesses
Harry Smith
Henry Howson Jr.

Inventor
David Shive
by his Attorneys
Howson & Son

N. PETERS, PHOTO-LITHOGRAPHER, WASHINGTON, D. C.

UNITED STATES PATENT OFFICE.

DAVID SHIVE, OF QUAKERTOWN, ASSIGNOR, BY MESNE ASSIGNMENTS, TO JOHN B. POWELL AND JOHN C. SHERBORNE, OF PHILADELPHIA, PA.

IMPROVEMENT IN SPRING-MOTORS.

Specification forming part of Letters Patent No. 176,203, dated April 18, 1876; Reissue No. 8,872, dated August 26, 1879; application filed August 2, 1879.

*To all whom it may concern:*

Be it known that I, DAVID SHIVE, formerly of Philadelphia, Pennsylvania, but now of Quakertown, Bucks county, same State, did invent certain Improvements in Spring-Motors, for which Letters Patent No. 176,203 were granted to me on the 18th of April, 1876; and I do hereby declare the following to be a full, clear, and exact description of the said invention, reference being had to the accompanying drawings.

The main feature of my invention consists of the combination, described hereinafter, of coiled springs contained in a barrel or barrels with an arbor or shaft made in sections, all substantially as described hereinafter.

The object of my invention is to obtain from a number of coiled springs a steady uniform motion, the continuance of which will be proportionate to the number of springs used, while the measure of power will be equivalent to that due to the recoil of one only of the springs.

Figure 1:
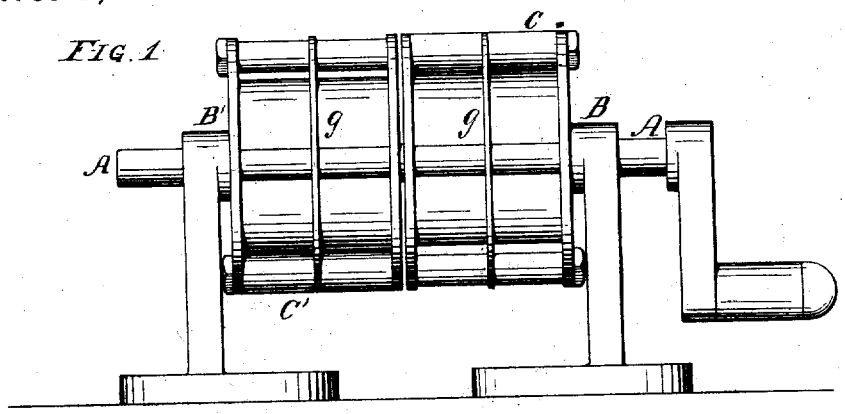
Figure 2:
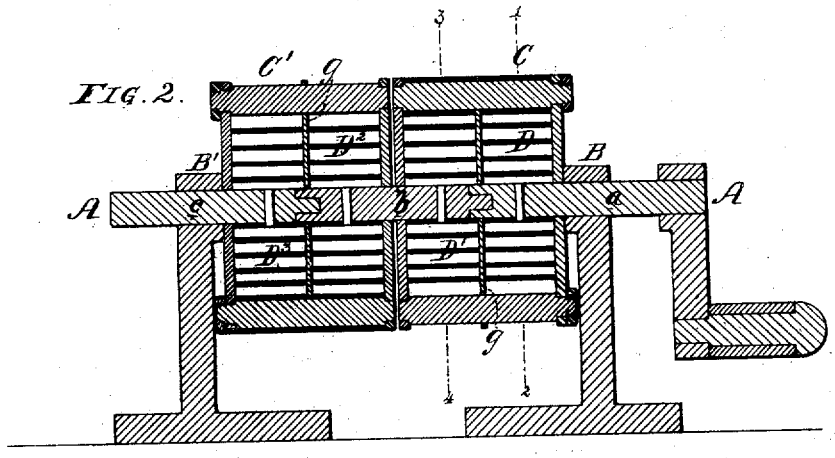
Figure 3:
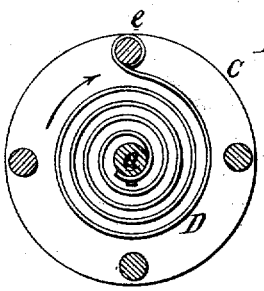

In the accompanying drawings, Figure 1 is a front view of my improved spring-motor; Fig. 2, a longitudinal section; Fig. 3, a transverse section on the line 1 2, and Fig. 4 a transverse section on the line 3 4.

A is an arbor or shaft, adapted to bearings B B′ on a suitable frame or stand, the said shaft being made in sections *a*, *b*, and *c*, fitted together by pin-and-socket joints, so that while the sections are always in line they are capable of turning independently of each other. Barrels C C′ are fitted snugly to this sectional shaft, but so as to turn independently of the same, these barrels being the means, in conjunction with the pin-and-socket joints, of preventing the shaft from sagging and of maintaining the sections of the shaft in line.

Each barrel contains two coiled springs, which are arranged and connected to the sectional shaft and to the barrel in the following manner: One spring, D, in the barrel C is connected at the outer end of its coil to the said barrel at *e*, Fig. 3, the inner end of the coil being secured to the section *a* of the shaft, and the inner end of the coil D′ is secured to the section *b* of the shaft, and the outer end to the same barrel. In other words, both springs are connected to the barrel; but one spring is secured to one section and the other to the adjoining section of the shaft.

Figure 4:
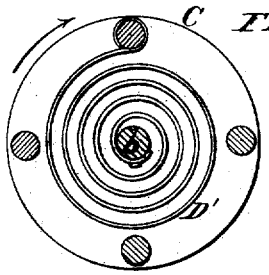

It will be observed on reference to Figs. 3 and 4 that the two springs D D′ are coiled in contrary directions, so that on turning the first section, *a*, of the shaft in the direction of the arrow, Fig. 3, to wind up the first spring, D, the power is exerted on the inner end of the coil, and this power is transmitted through the spring and through the barrel to the second spring, D′, which is coiled up by power exerted on the outer end of the coil, this power being transmitted to the section *b* of the shaft. Should this section *b* be fixed and the section *a* released, the power exerted to turn the released shaft will be the measure of power, and will be equivalent to that due to the recoil of one spring only; but, owing to the presence of the two springs in one barrel, and to the attachment of one spring to one section and the other to the other section, the length of time during which the exercise of the power due to the recoil is exerted will be twice that consumed in the recoiling of one spring.

In order to increase the duration of the action of the motor, any number of additional barrels may be used on the same shaft, each barrel containing two springs, providing there be a proper disposal of the shaft in sections.

In the drawings there is a second barrel, C′, containing two coiled springs, D″ and D‴, the intermediate section, *b*, of the shaft being connected to the inner end of the spring D″, and the outer end of the latter to the barrel which is connected to the last section, *c*, of the shaft by the spring D‴.

The number of springs and barrels may be increased to any extent desired, a section being added to the shaft for each additional barrel.

The power due to the coiled springs may be transmitted to suitable gearing from either end of the shaft; but the end opposite that from which the power is delivered must be fixed.

The first or winding-up section of the shaft should be provided with a ratchet adapted to a pawl for retaining the springs in a wound-up condition. Washers *g* may be interposed between the springs in each barrel.

I claim as my invention—

1. The combination, in a spring-motor, of a barrel, a shaft made in sections, and two coiled springs, connected together at their outer ends through the medium of the barrel, and at their inner ends to separate sections of the shaft, substantially as specified.

2. The combination, in a spring-motor, of a barrel, a shaft made in sections, and two springs coiled in reverse directions and connected to the barrel and to the sections of the shaft, all substantially as set forth.

3. The combination, in a spring-motor, of a shaft made in sections, the end of one fitting into a recess in the end of the other, with a barrel containing the within-described two springs, and made to fit the sections of the shaft, so as to aid in keeping the same in line, substantially as set forth.

4. A spring-motor in which two or more barrels, each containing the two springs described, are combined with a shaft made in sections, one of which connects one of the springs of one barrel with one of the springs of an adjoining barrel, substantially as specified.

5. The combination of the two springs of each barrel with a washer, *g*, interposed between the said springs, as set forth.

In testimony whereof I have signed my name to this specification in the presence of two subscribing witnesses.

DAVID SHIVE.

Witnesses:
HIRAM TICE,
J. H. WAMBOLD.